W. S. FAIRHURST.
VALVE.
APPLICATION FILED DEC. 21, 1905.

976,449.

Patented Nov. 22, 1910.

Witnesses:
F. G. Hachenberg.
Henry Thieme.

Inventor:
William S. Fairhurst
by attorneys

UNITED STATES PATENT OFFICE.

WILLIAM S. FAIRHURST, OF NEW YORK, N. Y.

VALVE.

976,449. Specification of Letters Patent. Patented Nov. 22, 1910.

Application filed December 21, 1905. Serial No. 292,832.

*To all whom it may concern:*

Be it known that I, WILLIAM S. FAIRHURST, a citizen of the United States, and resident of the borough of Brooklyn, in the city and State of New York, have invented new and useful Improvements in Valves, of which the following is a specification.

My invention relates to improvements in valves and has more particularly for its object to provide certain improvements in the construction, form and arrangement of the several parts of a discharge valve suitable for use in connection with air compressors.

A practical embodiment of my invention is represented in the accompanying drawings, in which—

Figure 1:
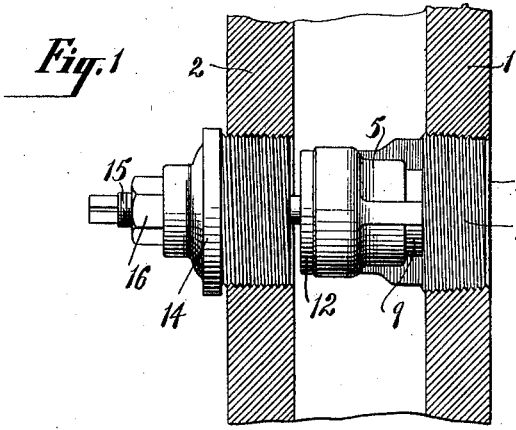
Figure 2:
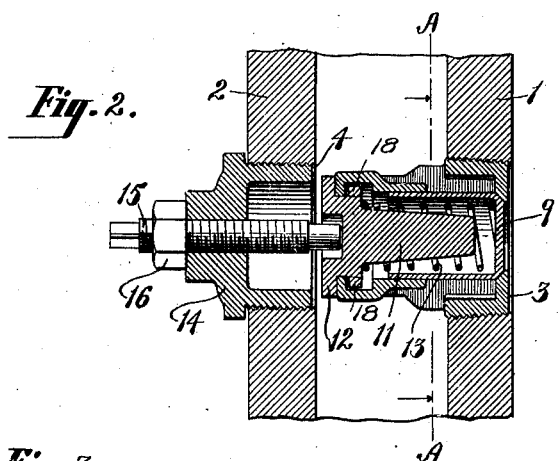
Figure 3:
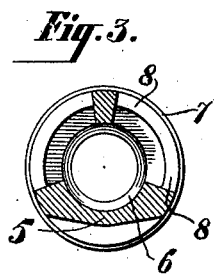
Figure 4:
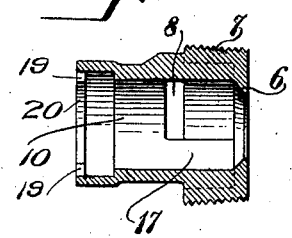

Figure 1 represents my improved valve in top plan, the same being shown in connection with the cylinder of an air compressor, Fig. 2 is a longitudinal central section through the same, Fig. 3 is a transverse section taken in the plane of the line A—A, of Fig. 2, looking in the direction of the arrows, and Fig. 4 is a longitudinal vertical central section through the combined cage and valve seat.

The inner and outer walls of the cylinder of an air compressor are herein represented by 1 and 2, respectively. The walls 1 and 2 are provided with screw threaded holes 3 and 4 in alinement with each other.

The body of the combined cage and valve seat is denoted by 5. It is provided with a seat for the valve at its inner end, which seat is denoted by 6. The inner end of the combined cage and valve seat is provided with a screw threaded head 7 arranged to be engaged with the screw threaded hole 3 in the inner wall 1. Adjacent to the seat proper 6 I provide a plurality of ports 8, in the present instance two such ports are shown.

The valve proper is denoted by 9 and it is fitted to the bore 10 of the combined cage and valve seat. This valve proper is hollow and a spring guide 11 projects into the interior of the said valve.

The head of the spring guide 11 is denoted by 12 and it is removably locked to the inner end of the combined cage and valve seat by providing the head of the spring guide 11 with oppositely arranged lugs 18 arranged to be inserted through oppositely arranged recesses 19 in an internal flange 20 at the inner end of the combined cage and valve seat, said spring guide being turned sufficiently to cause the lugs 18 to be moved out of register with the recesses 19 and thus engaged with the inner wall of said internal flange 20. A spring 13 is interposed between the valve and the head 12 of the spring guide 11 tending to hold the valve closed.

A hollow locking plug 14 has a screw threaded engagement with the hole 4 in the outer wall 2 and a locking screw 15 is carried by the plug 14 in position to have its inner end brought into engagement with the spring guide 11. A lock nut 16 is located on the screw 15 exterior to the plug 14 for locking the screw in its adjustment.

It has been found that the greatest wear upon the combined cage and valve seat occurs along the under side of its bore owing to the fact that these valves are ordinarily located in a horizontal position.

The object of this invention is to extend the life of the valve by providing an extended bearing for the valve proper in the bore of the combined cage and valve seat, which extended bearing is herein denoted by 17, the ports 8 being arranged in the upper part of the combined cage and valve seat.

By locating the valve seat at the inner end of the discharge valve, it will be seen that there will be no chamber formed between the cylinder chamber and the valve proper. Furthermore, I am enabled to secure a very large port area for permitting the free escape of the air when the valve is open.

What I claim is:—

In combination, a cage having a valve seat at the inner end thereof, a valve for said seat fitted to slide in the cage, said valve having an extended bearing along its under side throughout its entire length in the bore of said cage, a spring guide removably locked to the cage and a spring interposed between the said valve and guide for normally holding the valve on its seat.

In testimony, that I claim the foregoing as my invention, I have signed my name in presence of two witnesses, this 21st day of November, 1904.

WILLIAM S. FAIRHURST.

Witnesses:
 FREDK. HAYNES,
 HENRY THIEME.